United States Patent [19]
Weiertz

[11] 3,780,719
[45] Dec. 25, 1973

[54] INTERNAL COMBUSTION ENGINE

[76] Inventor: Axel Hugo Weiertz, Bellevuevagen 24, Malmo, Sweden

[22] Filed: July 30, 1971

[21] Appl. No.: 167,708

[52] U.S. Cl........ 123/188 C, 123/52 ML, 123/75 A
[51] Int. Cl.............................................. F01l 5/06
[58] Field of Search.................. 123/52 ML, 188 C, 123/75 A

[56] References Cited
UNITED STATES PATENTS

| | | | |
|---|---|---|---|
| 2,274,197 | 2/1942 | Godfrey | 123/75 A |
| 1,597,882 | 8/1926 | Hackethal | 123/52 ML |
| 1,169,353 | 1/1916 | Reeve | 123/188 C X |

FOREIGN PATENTS OR APPLICATIONS

| | | | |
|---|---|---|---|
| 23,117 | 6/1913 | Great Britain | 123/52 ML |
| 132,159 | 9/1919 | Great Britain | 123/75 A |

*Primary Examiner*—Wendell E. Burns
*Attorney*—Jones & Lockwood

[57] ABSTRACT

An internal combustion engine having a cylinder and a piston reciprocable therein is provided with an inlet manifold having an air intake and a connection to the inlet of the cylinder, which forms a closed circulation path for air drawn into the inlet manifold when the engine is operating.

2 Claims, 5 Drawing Figures

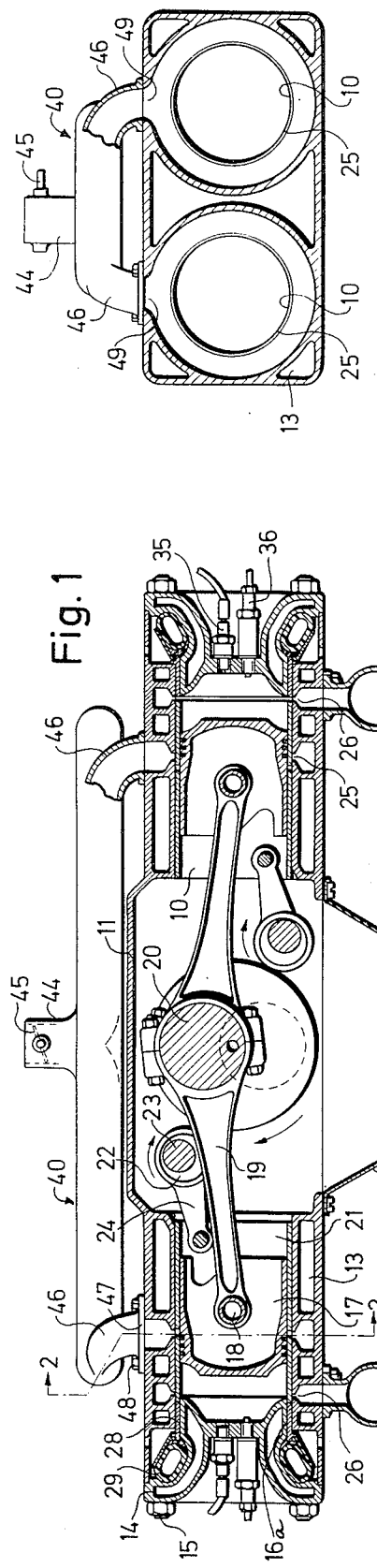
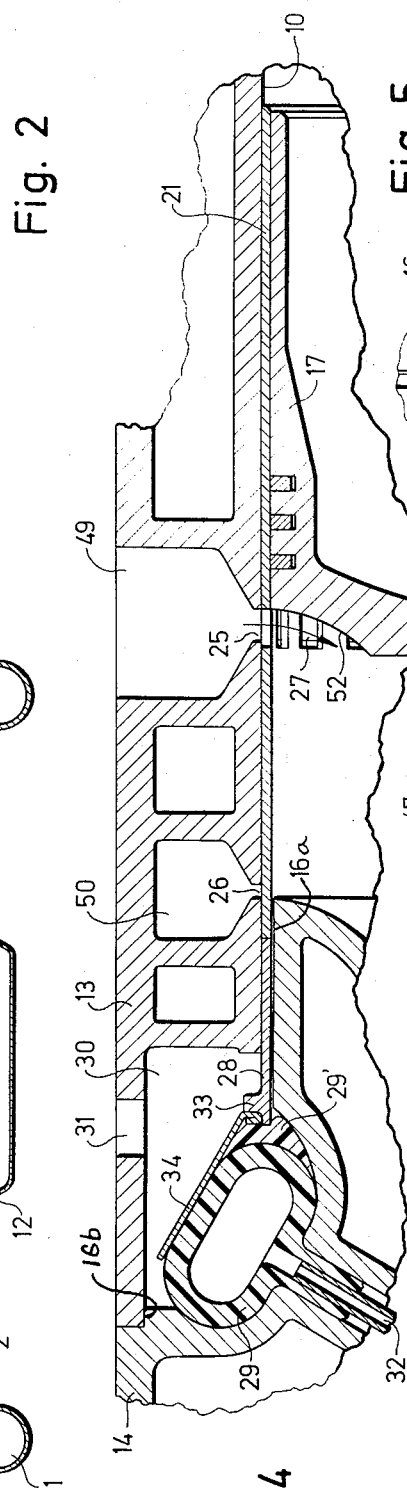
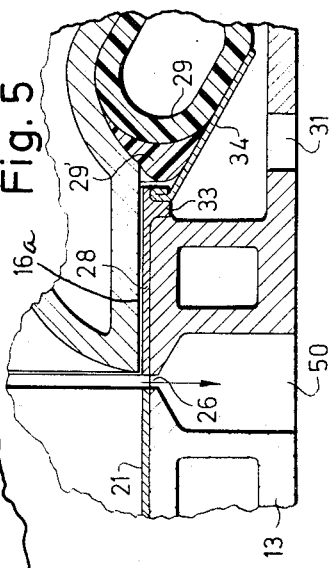
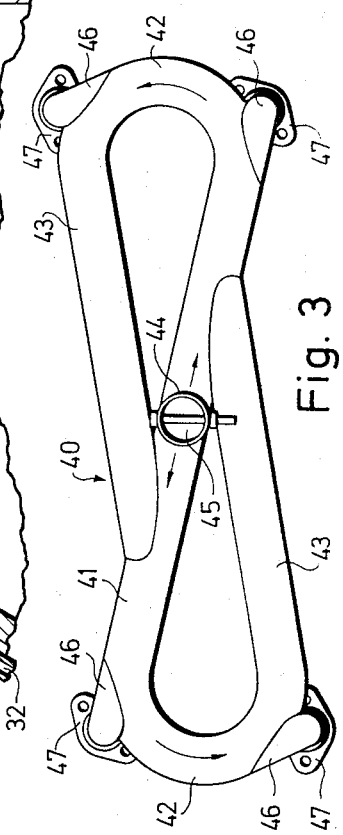
Fig. 1
Fig. 2
Fig. 3
Fig. 4
Fig. 5

INTERNAL COMBUSTION ENGINE

The present invention relates to internal combustion engines; more particularly it is an improvement in an inlet manifold for such engines.

Inlet manifolds for internal combustion engines commonly comprise a substantially straight tube having a number of branch tubes each connected with one of the cylinders of the engine. The communication between each branch tube and the interior of the associated cylinder is controlled by a valve usually an ordinary poppet valve. However, also sleeve valves and rotary valves are used for this purpose. Each time the valve is being closed at the end of the induction stroke of the piston reciprocating in the cylinder, the fluid flow through the branch tube is suddenly interrupted. This involves a loss of kinetic energy of the flowing fluid. The object of the invention is to improve the inlet manifold so as to utilize this kinetic energy in order to provide a super charging effect in the engine.

According to the invention there is provided in combination with an internal combustion engine comprising a cylinder, a piston reciprocable therein, an inlet, an outlet, and means controlling the fluid flow through the inlet and the outlet, the improvement which comprises an inlet manifold having an air intake and a connection to the inlet and forming a circulation path for air drawn into the inlet manifold by the reciprocating piston.

A preferred embodiment now will be described with reference to the drawing which shows by way of example a flat four-cylinder internal combustion engine of the sleeve type provided with the improved inlet manifold according to the invention. However, it will be understood that the inlet manifold according to the invention may be combined with engines having valves of other type such as conventional poppet valves.

FIG. 1 is a cross sectional view of the engine taken through two opposite cylinders thereof the inlet manifold being shown partly in elevational view and partly in sectional view;

FIG. 2 is a sectional view taken on line 2—2 in FIG. 1 through one pair of cylinders:

FIG. 3 is a plan view of the improved inlet manifold;

FIG. 4 is an enlarged fragmentary sectional view taken axially of a cylinder and the piston reciprocable therein; and FIG. 5 is part of a sectional view as that of FIG. 4, showing the sleeve valve in another position than that in FIG. 4.

Referring now to the drawing in detail, the present invention is illustrated in connection with a flat internal combustion engine having two pairs of opposed cylinders 10 integrally connected to one end thereof with a crank case 11 having a bottom 12 which forms an oil sump. The cylinders of each pair are surrounded by a water cooling jacket 13 and are closed at the other end by a water cooled cylinder head 14 connected with the cylinder by screw and bolt connections 15. The cylinder head 14 forms two collars at 16a and 16b each projecting into one of the associated cylinders. The collar 16a forms a cylindrical surface which is spaced from the cylindrical surface of the cylinder. In each cylinder there is a piston 17 which is connected by a gudgeon pin 18 with a connecting rod 19 journalled on a crank shaft 20.

The engine is of the sleeve valve type wherein the sleeve valve takes the form of a cylindrical sleeve 21, open at both ends, which is fitted inside the cylinder 10, the piston 17 being free to move inside the sleeve. This is connected to an eccentric 22 on a shaft 23 by means of a small sleeve connecting rod 24. The shaft 23 is connected to the crank shaft 20 by means of suitable gearing or a chain drive in order to be rotated in a predetermined relation to the crank shaft in the same rotational direction as the crank shaft and with an rmp which is half the rpm of the crank shaft 20. Thereby the sleeve 21 is caused to slidingly reciprocate a small distance in the associated cylinder in order to control an annular inlet port 25 and an annular outlet port 26 each formed as a circular slot in the cylinder wall. A number of circumferentially spaced openings 27 are provided in the sleeve 21 and are adapted to be brought into register with the inlet port 25 by the reciprocating movement of the slide at the proper time in the four-stroke cycle in order to open the inlet port 25 to the interior of the cylinder 10. The outlet port 26 is controlled by the end portion of the slide 21, remote from the crank case 11. This end portion cooperates with a second sleeve 28 which is guided for reciprocating movement in the space formed between the cylinder 10 and the collar 16a on the cylinder head 14. The sleeve 28 is biased by a pneumatic spring formed by a hose 29 of reinforced flexible heat resistant material such as synthetic rubber which forms a closed ring surrounding the cylinder head and enclosed in a space 30 formed by the water cooling jacket 13 and having venting openings 31. The hose 29 is provided with a connection 32 through which air may be supplied to the interior of the hose in order to provide a predetermined overpressure therein. The connection 32 may be provided with closure means such as a valve of the type used in tire tubes. The hoses 29 of the four cylinders may be interconnected to form a common pneumatic system having a common valve. The slide or sleeve 28 is formed with an annular bead 33 to which is connected a metal sheet flange 34 bearing on the hose. The sleeve 28 is normally held in a position wherein the end of the sleeve near the crank case is close to the outlet port 26 and preferably flush with the walls thereof as shown in FIG. 5. At the proper time in the cycle of the engine the end of the sleeve 21 remote from the crank case 11 is spaced from the adjacent edge of the sleeve 28 to leave the outlet port 26 open to the interior of the cylinder 10. When the sleeve 21 is axially moved against the sleeve 28 by the connecting rod 24 the sleeve 21 will close the port 26 and then will engage the sleeve 28 which will be pushed back axially by the sleeve 21 against the biassing force provided on sleeve 28 by the hose 29 over the metal sheet flange 34.

In the cylinder head 14 there is provided for each cylinder an electric spark plug 35 connected to a conventional ignition system, and an oil injection nozzle 36 connected to a fuel supply system. This nozzle may be constructed for solid or airless injection or for air-spray injection. It is preferred to use in the engine described the air-spray injection the fuel being forced into the cylinder by a jet of air.

An air inlet manifold generally indicated by 40 in the shape of a bow is provided on top of the engine and comprises a tube forming a straight portion 41, two curved portions 42 one connected at each end of the straight portion 41 and joining each a straight portion 43 which is connected to the straight portion 41 one at each side of the longitudinal center of the portion 41. Centrally of the portion 41 there is connected to this portion an intake pipe 44 in which there is rotatably journalled a throttle 45 connected with the control system of the engine. At the locations where the curved portions 42 join the straight portions 41 and 43, respectively, there are connected branch tubes 46 extending substantially tangentially from the curved portions. These branch tubes are bent downwardly and are provided at the lower end thereof with connection flanges 47 bolted to the engine by bolt connections 48 one to each of the four cylinders 10. Each branch tube 46 communicates with a passage 49 which extends through the water jacket 13 to communicate with the inlet port 25.

The inlet manifold shown and described is illustrative only. The form and construction thereof may be substantially modified in order to suit the special type of the associated engine.

Each outlet port 26 communicates through a passage 50 extending through the water jacket 13, with an exhaust tube 51 which in turn connects with a conventional exhaust system of the engine.

The reciprocating movement of the piston 17 and the sleeve 21 associated with each of the cylinders 10 are interrelated by the gearing provided between the crank shaft 20 and the shafts 23 as is necessary such that the engine will operate in accordance with the four-stroke cycle including an induction stroke, a compression stroke, a firing stroke and an exhaust stroke. During the induction stroke the inlet port 25 will initially be closed by the sleeve 21 in order to provide in the cylinder an underpressure i.e., subatmospheric pressure or vacuum during the movement of the piston 17 towards the crank case 11. Due to this underpressure a jet of air is drawn into the cylinder through the fuel and air nozzle 36 and under the control of the fuel supply system fuel is forced by the jet of air into the cylinder. When the sleeve 21 opens the inlet port 25 the openings 27 being brought into register with said port, the underpressure in the cylinder will be suddenly broken down by air being drawn into the cylinder. The air will flow at a high velocity into the cylinder. The piston 17 is formed with an annular shoulder 52 forming a smoothly curved surface, and by interrelating the movement of the piston 17 and the movement of the sleeve 21 in such a way that this shoulder moves to a position just opposite the openings 27 when these are being brought into register with the inlet port 25 the air flowing into the cylinder will be deflected by the shoulder towards the centre of the cylinder as indicated by the arrow in FIG. 4, in order to form a plurality of vortices when entering the cylinder, which provide an effective mixture of the air and the fuel injected into the cylinder. Furthermore, there will be provided an efficient cooling of the cylinder as well as the piston and the sleeve by the fall of temperature associated with the fall of internal pressure in the cylinder during the induction stroke and by the turbulating air entering the cylinder. Particularly the cooling of the piston is advantageous because this will prevent the forming of nitric oxide in the cylinder during the operation of the engine.

During the induction stroke of the engine the air entering the inlet manifold 40 through the air intake 44 will flow at a high velocity through the inlet manifold. When the air flow to one cylinder is suddenly interrupted due to the fact that the inlet port 25 of the cylinder is abruptly closed by the sleeve 21 the air flowing in the inlet manifold will be caused to circulate in a closed path therein. However, when one cylinder inlet port is closed another one will be opened and air will pass thereinto. The circulating air mass in the manifold represents a large momentum, and this will be utilized in the inlet manifold according to the invention by providing a super charging pressure at rpm:s over a predetermined value. When an inlet port is opened the moving air will flow at a high velocity into the associated cylinder providing a great volumetric efficiency. This means that the engine may be operated at a high rpm and a high compression ratio although a lead-free fuel having a low octane number is being used as fuel therein.

In the slot or annular passage formed between the collar 16a and the cylinder 10 and receiving the slide 28 there may be allowed a leakage dependant on the length and the width of said slot. The hose 29 or a bead 29' formed thereon and consisting of the same material as the hose or of another material forms an outer seal for said slot, and due to the fact that the slot is surrounded by water cooled portions of the engine the material of the hose and the bead will be protected against the high temperature obtained in the cylinder when the engine is operating. During the reciprocating movement of the sleeve 28 surrounding air is alternatingly drawn into the space 30 through the openings 31 and forced out from this space through said openings by the reciprocating sheet metal flange 34 operating as a piston. Due to this air exchange in the space 30 there is obtained an additional cooling action lowering the temperature of the hose 29 and the bead 29' thereon. When the engine is operating at a high speed the exhaust gases formed in the cylinder will not be able to flow through the slot formed between the collar 16a and the cylinder 10 due to the inertia of the gas; a gas mass will be pusalting in the slot and will form at the hose 29 or the bead 29' a gas cushion of a lower temperature than the gas entering the slot from the interior of the cylinder. Thus, it will not be necessary to provide sealings between the sleeve 28 and the surrounding walls as has heretofore been necessary. By this effect there is achieved at a lower speed a lower compression ratio and at a higher speed a higher compression ratio which is advantageous for an efficient operation of the engine.

What I claim is:

1. In combination with an internal combustion engine comprising a cylinder, a piston reciprocable therein, an inlet and an outlet in the cylinder, means for injecting fuel into the cylinder, a sliding sleeve in the cylinder having aperture means therein cooperating with the inlet under creation of a vacuum in the cylinder during the suction stroke of the piston and an end portion of said sleeve cooperating with said outlet for opening and closing the same, means for reciprocating said sleeve in the cylinder, an annular passage formed by the cylinder at an end thereof, a second sleeve received in said annular passage to be engaged by said end portion of the first sleeve after it closes the outlet to be pushed back thereby, an annular pneumatic cushion biasing the second sleeve to yieldingly resist the movement thereof when pushed back by said end portion of the first sleeve, and an inlet manifold having an air intake and a connection to the inlet and forming a circulation path for air drawn into the inlet manifold by the reciprocating piston.

2. In combination with an internal combustion engine comprising a cylinder, a cylinder head, a piston reciprocable therein, an inlet, an outlet, means for injecting fuel into the cylinder, means controlling the fluid flow through the inlet and the outlet under creation of a vacuum in the cylinder during the suction stroke of the piston, said means controlling the inlet and outlet comprising a first sliding sleeve in the cylinder and means for reciprocating the sleeve in the cylinder, an inlet manifold having an air intake and a connection to the inlet and forming a circulation path for air drawn into the manifold by the reciprocating piston, said first sliding sleeve forms an annular end portion controlling the flow through the outlet, said cylinder head having an annular collar thereon received within said cylinder and forming an annular space therebetween, a second sliding sleeve received within said annular space and forming therewithin an annular passage, said second sleeve being engaged by the end portion of said first sliding sleeve after closing the outlet and being pushed back thereby, means comprising an annular pneumatic cushion biasing the second sliding sleeve to yieldingly resist the movement thereof when pushed back by the annular end portion on the first sliding sleeve, and an annular space formed between said cylinder head and the surrounding end of the cylinder, said space being in communication with the outside atmosphere through a vent aperture in said cylinder and with said annular passage about said second sleeve, said biasing means when not pushed back by said second sleeve causing said annular passage about said second sleeve to be closed off from communication with said annular space formed between said cylinder head and the surrounding end of the cylinder.

* * * * *